United States Patent
Mishima

(10) Patent No.: US 8,384,840 B2
(45) Date of Patent: Feb. 26, 2013

(54) LIQUID CRYSTAL DISPLAY DEVICE

(75) Inventor: Yasuyuki Mishima, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 145 days.

(21) Appl. No.: 12/963,735

(22) Filed: Dec. 9, 2010

(65) Prior Publication Data
US 2011/0157512 A1    Jun. 30, 2011

(30) Foreign Application Priority Data
Dec. 25, 2009    (JP) .................................. 2009-294542

(51) Int. Cl.
*G02F 1/1333* (2006.01)
(52) U.S. Cl. .......................................... 349/58; 349/150
(58) Field of Classification Search ..................... 349/58
See application file for complete search history.

(56) References Cited

U.S. PATENT DOCUMENTS
7,924,389 B2 *  4/2011  Han et al. ...................... 349/150
2008/0297689 A1 * 12/2008  Nishita ........................... 349/58

FOREIGN PATENT DOCUMENTS
JP    2003-344851    12/2003
JP    2007-128820    5/2007

* cited by examiner

*Primary Examiner* — Richard Kim
(74) *Attorney, Agent, or Firm* — Antonelli, Terry, Stout & Kraus, LLP

(57) ABSTRACT

A liquid crystal display device includes a liquid crystal display panel on a mold, and a backlight placed in the mold. The backlight includes a light guide panel, an LED provided on a side surface of the liquid guide panel, and other components. A main flexible wiring substrate is attached to the liquid crystal display panel, and extends to a back surface of the mold. The LED is mounted on an LED flexible wiring substrate. At least one electronic component mounted on the main flexible wiring substrate is arranged on an end surface of the mold. Then, an insulating sheet is provided between the at least one electronic component and the LED to prevent short circuit between them, instead of using a partition wall for electrical insulation.

6 Claims, 4 Drawing Sheets

LIQUID CRYSTAL DISPLAY DEVICE

CLAIM OF PRIORITY

The present application claims priority from Japanese Patent Application JP 2009-294542 filed on Dec. 25, 2009, the content of which is hereby incorporated by reference into this application.

FIELD OF THE INVENTION

The present invention relates to a display device, and more particularly to a configuration for reducing the overall size of a small liquid crystal display device.

BACKGROUND OF THE INVENTION

For a liquid crystal display device used in mobile phone and personal digital assistant (PDA), a reduction in thickness is demanded. In addition, there is also a strong demand for making the screen larger while keeping the overall size smaller, namely, making it in the so-called narrow frame form. The small liquid crystal display device uses a light emitting diode (LED) as a light source of a backlight. However, the method of arranging the LED, the method of supplying electric current to the LED, and the use efficiency of the light from the LED are problems when trying to reduce the thickness and overall size of the liquid crystal display device.

In the configuration disclosed in JP-A No. 128820/2007, an LED is provided on a side surface of a light guide panel. A reflective sheet is provided on the back side of the light guide panel. The thickness of a portion of the reflective sheet is reduced, in which an LED flexible wiring sheet is provided to supply power to the LED.

In the configuration disclosed in JP-A No. 344851/2003, an LED is mounted on a main flexible wiring substrate attached to a liquid display panel. The main flexible wiring substrate is folded toward the back side so that the LED is provided on a side surface of the light guide panel. In JP-A No. 344851/2003, at this time, a light shielding pattern is formed in a portion of the back side of the main flexible wiring substrate to prevent the light of the LED from leaking to the outside through the main flexible wiring substrate.

In the method described above, the LED mounted on the main flexible wiring substrate is placed on a side surface of the light guide panel by folding the main flexible wiring substrate toward the back side of the light guide panel. However, this method has a problem in that it is difficult to obtain sufficient accuracy of the LED arrangement. In order to solve this problem, the following method has been proposed. There are separately formed two substrates, one is a main flexible wiring substrate attached to a liquid crystal display panel, and the other is an LED flexible wiring substrate for supplying power to the LED. Then, the main flexible wiring substrate and the LED flexible wiring substrate are attached to each other. This method can facilitate the LED to be placed at appropriate place in the light guide panel, without being constrained by the position of the main flexible wiring substrate.

In this case, the LED flexible wiring substrate is fixed to a portion of the light guide panel. The main flexible wiring substrate is fixed to a mold on which the liquid crystal display panel is mounted. Because the setting of the LED flexible wiring substrate and the main flexible wiring substrate at appropriate locations is prioritized, interference may occur between the electronic component mounted on the main flexible wiring substrate, and the LED mounted on the LED flexible wiring substrate.

The electronic component, solder around the connection, wiring, and the like, are formed to be exposed in the main flexible wiring substrate. Also the LED, solder around the connection, and the like, are formed to be exposed in the FED flexible wiring substrate. The main flexible wiring substrate and the LED flexible wiring substrate are arranged to overlap each other, and are finally attached to each other. In such a configuration, there may be a risk of short circuit between the electronic component, the solder around the connection, the wiring, and the like, in the main flexible wiring substrate, and the LED and the solder around the connection in the LED flexible wiring substrate.

This risk has been reduced by forming a partition wall between the portion of the electronic component mounted on the main flexible wiring substrate, and the portion of the LED, in order to prevent the electronic component from coming into contact with the LED, or with the solder around the connection and the like.

However, in this configuration, it is necessary to form the partition wall within the mold, thereby increasing the overall size of the mold. As a result, the overall size of the liquid crystal display device is increased. In addition, the space on both sides of the partition wall should be large enough to prevent the destruction of the LED or the electronic component due to the contact between the partition wall and the LED or the electronic component. This space requirement has caused a further increase in the overall size of the mold or in the overall size of the liquid crystal display device.

SUMMARY OF THE INVENTION

The present invention aims to solve the above problems, and to provide a configuration for reducing the overall size of the liquid crystal display device, without reducing the accuracy of LED setting while maintaining the reliability of the liquid crystal display device.

The present invention solves the above problem by means described in detail below.

(1) There is provided a liquid crystal display device including a liquid crystal display panel mounted on a mold, and a backlight placed in the mold. The backlight includes a light guide panel, an LED provided on a side surface of the light guide panel, and a reflective sheet provided on a back side of the light guide panel. A main flexible wiring substrate on which at least one electronic component is mounted is attached to the liquid crystal display panel. The at least one electronic component is arranged along an end surface of the mold. The LED is mounted on an LED flexible wiring substrate. An insulting sheet is provided between the electronic component and the LED.

(2) In the liquid crystal display device described in (1), the insulting sheet is bonded to the electronic component and to the reflective sheet.

(3) In the liquid crystal display device described in (1), the insulating sheet is bonded to the electronic component and to the LED.

(4) In the liquid crystal display device described in (1), the insulating sheet is a white adhesive sheet.

(5) In the liquid crystal display device described in (1), the insulating sheet is formed of the same material as a double-sided adhesive sheet bonding the liquid crystal display panel and the mold together.

(6) There is provided a liquid crystal display device including a liquid crystal display panel mounted on a mold, and a backlight placed in the mold. The backlight includes a light guide panel, an LED provided on a side surface of the light guide panel, and a reflective sheet provided on a back side of the light guide panel. A main flexible wiring substrate on which at least one electronic component is mounted is attached to the liquid crystal display panel. The at least one electronic component is arranged along an end surface of the mold. The main flexible wiring substrate is fixed to the mold. The LED is mounted on an LED flexible wiring substrate. The LED flexible wiring substrate is fixed to the light guide panel. An insulating sheet is formed between the electronic component and the LED.

According to the present invention, the partition wall for electrically insulating the electronic component and the LED is not present in the mold. Thus, the overall size of the mold can be reduced by the area of the partition wall. In addition, it is possible to eliminate the space for preventing the destruction of the LED or the electronic component due to the contact between the partition wall and the LED or the electronic component. As a result, the overall size of the crystal display device can be reduced.

DETAILED DESCRIPTION OF THE PREFERRED EMBODIMENTS

Before specific embodiments of the present invention are described, the description will focus on a liquid crystal display device to which the present invention is applied, along with the detailed description of the conventional problem with reference to the accompanying drawings.

Figure 5:
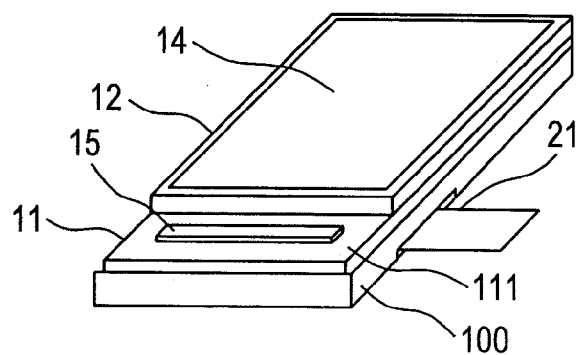
FIG. 5 is a perspective view of the liquid crystal display device.

FIG. 5 is a perspective view of a small liquid crystal display device used in a mobile phone. In FIG. 5, a liquid crystal display panel is mounted on a mold 30 not shown, and is placed in a metal frame 100. The liquid crystal display panel includes a TFT substrate 11, a color filter substrate 12, an upper polarization plate 14 bonded to the color filter substrate 12, and a lower polarization plate 13, not shown, bonded to the TFT substrate 11.

The TFT substrate 11 is made larger than the color filter substrate 12. The TFT substrate 11 has an exposed portion serving as a terminal area 111. The terminal area 111 includes a drive IC 15 to drive the liquid crystal display panel. Although not shown in FIG. 5, a main flexible wiring substrate is attached to the terminal area 111 in order to supply power, signals, and the like, to the liquid crystal display panel including the drive IC 15. A cutout is formed on a side portion of the metal frame 100. An interface 21 extends from the cutout to connect the main flexible wiring substrate to an external circuit.

Figure 6:
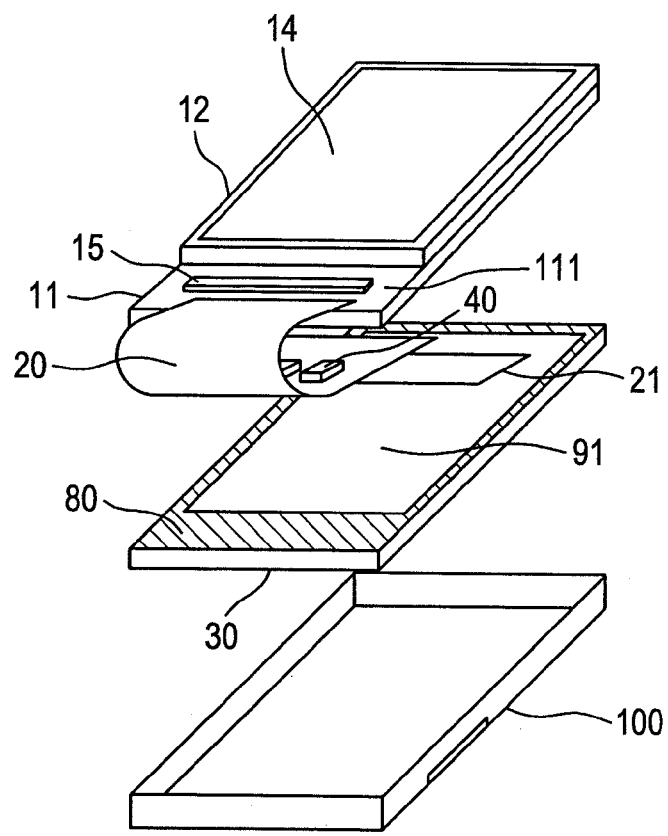
FIG. 6 is an exploded perspective view of the liquid crystal display device.

FIG. 6 is an exploded perspective view of the liquid crystal display device shown in FIG. 5. In FIG. 6, the main flexible wiring substrate 20 is attached to the terminal area 111. An electronic component 40 is mounted on the main flexible wiring substrate 20. The main flexible wiring substrate 20 is folded toward the back side of the liquid crystal display panel to reduce the surface area of the liquid crystal display device.

In FIG. 6, the liquid crystal display panel is mounted on the front side of the mold 30 formed of resin, through a light shielding double-sided adhesive tape 80. The light shielding double-sided adhesive tape 80 fixes the liquid crystal display panel to the mold 30. Another function of the light shielding double-sided adhesive tape 80 is to prevent leakage of the light from an LED 50 that causes a reduction in the contrast of the screen. The mold 30 includes a light guide panel 90, an optical sheet stack 91, and a backlight including the LED 50 and the like. In FIG. 6, only the uppermost sheet of the optical sheet stack 91 can be seen. The metal frame 100 is provided on the back side of the mold 30.

In FIG. 6, it appears as if the main flexile wiring substrate 20 is folded to extend between the liquid crystal display panel and the mold 30. This is to explicitly show the components. Actually, the main flexible wiring substrate 20 is folded toward the back side of the mold 30. The interface 21 extends from the main flexible wiring substrate 20 on the right side of the figure. The liquid crystal display panel and the mold 30 are assembled together, and are placed in the metal frame 100.

Figure 7:
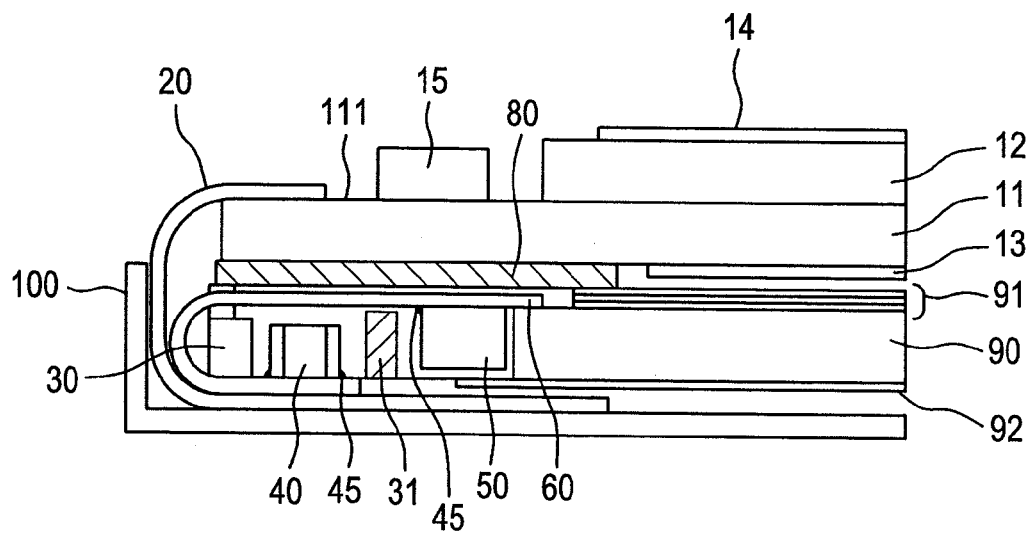
FIG. 7 is a cross-sectional view of a liquid crystal display device according to a conventional example.

FIG. 7 is a cross-sectional view of the assembled liquid crystal display device. In FIG. 7, the liquid crystal display panel is mounted on the mold 30 through the light shielding double-sided adhesive tape 80. The liquid crystal display panel includes the TFT substrate 11 and the color filter substrate 12. The lower polarization plate 13 is bonded to the lower surface of the TFT substrate 11, and the upper polarization plate 14 is bonded to the upper surface of the color filter substrate 12. The drive IC 15 is mounted on the terminal area 111. Further, the main flexible wiring substrate 20 is attached to the terminal area 111.

The backlight is placed in the mold 30. The backlight includes the LED 50 as a light source, the light guide panel 90, a reflective sheet 92 provided below the light guide panel 90, and the optical sheet stack 91 provided on the light guide panel 90. Light from the LED 50 is incident from a side portion of the light guide panel 90. Then, the light is directed to the liquid crystal display panel from the upper side of the light guide panel 90 through the optical sheet stack 91. The optical sheet stack 91 includes a diffusion sheet for equalizing the light to the liquid crystal display panel, a prism sheet for directing the light to the liquid crystal display panel, and the like. The reflective sheet 92 is provided below the light guide panel 90, to direct the light emitted from the LED 50 to the liquid crystal display panel.

The distance between the LED 50 and the side of the light guide panel 90 has a great influence on the use efficiency of the light from the LED 50. In other words, when the distance between the LED 50 and the side of the light guide panel 90 is large, the use efficiency of the light from the LED 50 is significantly reduced. Thus, the distance between the LED 50 and the side of the light guide panel 90 should be reduced by increasing the setting accuracy of the LED 50. In FIG. 7, instead of mounting the LED 50 on the main flexible wiring substrate 20, an LED flexible wiring substrate 60 is separately formed in order to increase the setting accuracy of the LED 50.

In FIG. 7, both the LED flexible wiring substrate 60 and the main flexible wiring substrate 20 are folded to face the back side of the mold 30. Then, the LED flexible wiring substrate 60 is finally attached to the main flexible wiring substrate 20. The main flexible wiring substrate 20 is fixed to the mold 30, and the LED flexible wiring substrate 60 is fixed to a portion of the light guide panel 90.

In FIG. 7, the LED 50 is attached to the LED flexible wiring substrate 60 by a solder 45. The LED 50 is disposed downward from the LED flexible wiring substrate 60. The LED 50, the solder 45 around the connection, and the wiring are formed to be exposed in the LED flexible wiring substrate 60. Also, the electronic component 40, the solder 45 around the connection, and the wiring are formed to be exposed in the main flexible wiring substrate 20. Thus, there is a risk of short circuit between the electronic component 40, and the like, mounted on the main flexible wiring substrate 20, and the LED 50, and the like, mounted on the LED flexible wiring substrate 60.

This risk is reduced by forming a partition wall 31 of a mold material between the portion of the LED 50, and the portion of the electronic component 40. The partition wall 31 electrically insulates the electronic component 40 and the LED 50. However, the presence of the partition wall 31 increases the overall size of the mold 30. As a result, the overall size of the liquid crystal display device is increased. The width of the partition wall 31 is 0.25 mm to 0.3 mm. In addition, the space on the both sides of the partition wall 31 should be large enough to prevent the destruction of the LED 50 or the electronic component 40 due to the contact between the partition wall 31 and the LED 50 or the electronic component 40. This space requirement causes a further increase in the overall size of the mold 30. As a result, the overall size of the liquid crystal display device is increased.

Figure 8:
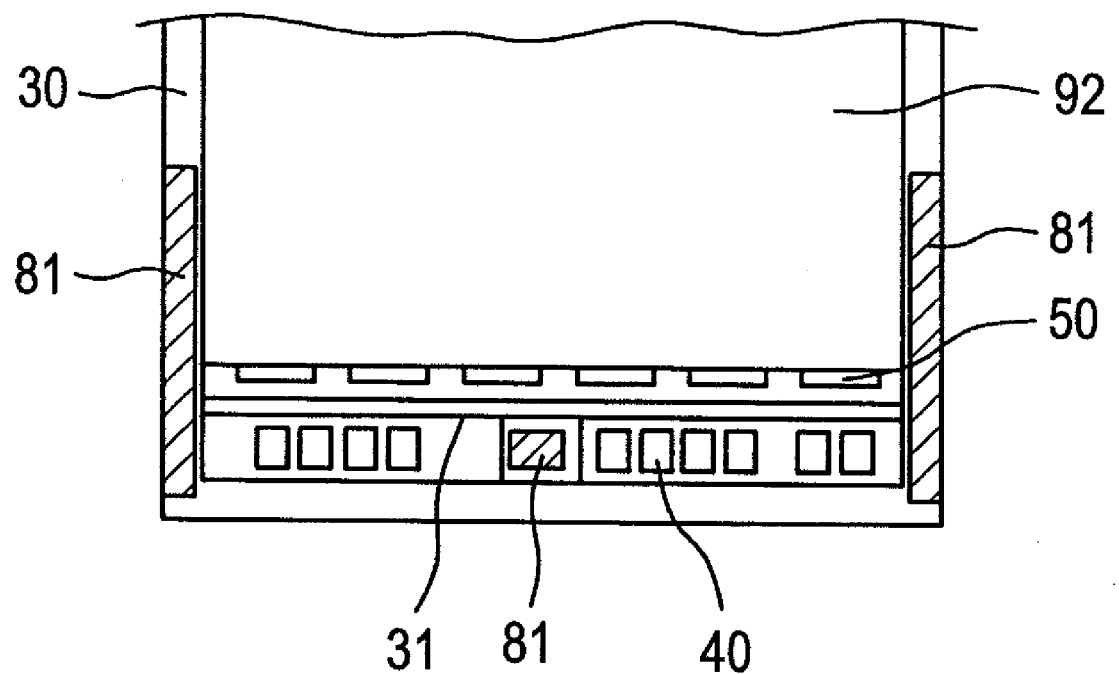
FIG. 8 is a back view of the liquid crystal display device according to the conventional example.

FIG. 8 is a view from the back side of the liquid crystal display device shown in FIG. 7. In FIG. 8, the metal frame 100, the main flexible wiring substrate 20, and the LED flexible wiring substrate 60 are omitted. In FIG. 8, the backlight and the electronic component 40 mounted on the main flexible wiring substrate 20 are placed in the mold 30. However, FIG. 8 is a back view in which only the reflective sheet 92 can be seen as the optical component. A mold-frame adhesive sheet 81 is present in the mold 30 to fix it to the metal frame 100.

In FIG. 8, there are six LEDs 50 arranged in the lateral direction. However, the LEDs 50 are partially hidden by the reflective sheet 92. The electronic components 40 are arranged along an end portion of the mold 30. The partition wall 31 is formed between the LEDs 50 and the electronic components 40 to prevent the LEDs 50 and the electronic components 40 from coming into contact with each other and prevent a short circuit between them. The electronic components 40 are provided between the end portion of the mold 30 and the partition wall 31. At this time, enough space is provided to accommodate the electronic components 40 to prevent the electronic components 40 from coming into contact with the partition wall 31 and prevent the electronic components 40 from being destroyed. In addition, a predetermined distance is set between the LEDs 50 and the partition wall 31 to prevent the LEDs 50 from coming into contact with the partition wall 31 and prevent the LEDs 50 from being destroyed.

According to the present invention shown by the following embodiments, it is possible to prevent the problem that the overall size of the liquid crystal display device increases due to the presence of the partition wall 31 as described above.

First Embodiment

Figure 1:
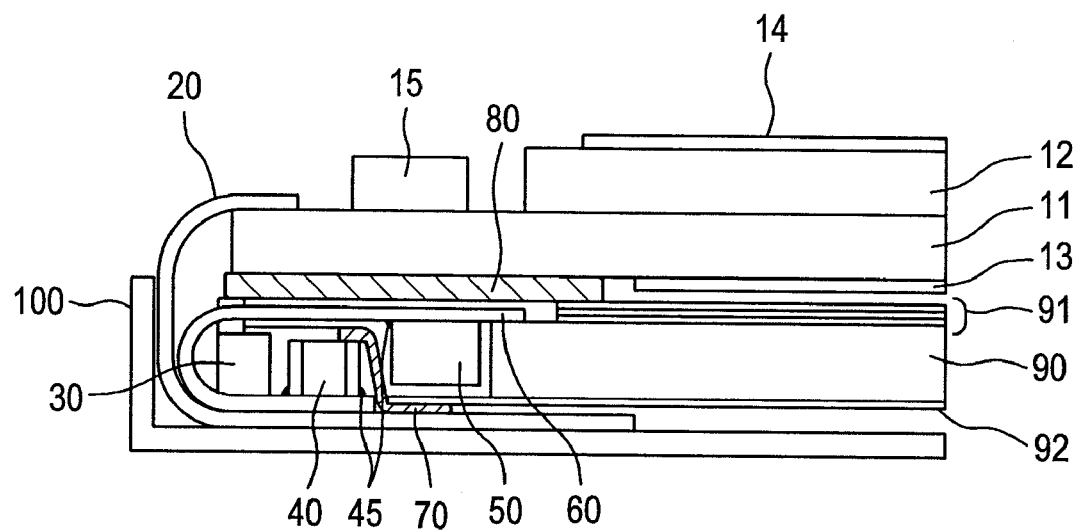
FIG. 1 is a cross-sectional view of a liquid crystal display device according to a first embodiment.

FIG. 1 is a cross-sectional view of a liquid crystal display device according to a first embodiment of the present invention. FIG. 1 is very different from FIG. 7 showing a conventional example in that the partition wall 31 is not present in the mold 30 in FIG. 1. The absence of the partition wall 31 leads to a risk of short circuit due to the contact between the electronic component 40 and the LED 50. In a first embodiment, a flexible insulating sheet 70 is provided between the LED 50 and the electronic component 40, in order to avoid the risk of short circuit between the LED 50 and the electronic component 40. The insulating sheet 70 covers the electronic component 40 and the side portion of the LED 50, extending to the back side of the reflective sheet 92. The electronic component 40 and the LED 50 are electrically insulated by the insulating sheet 70. As shown in FIG. 1, the resin mold 30, the electronic component 40, the insulating sheet 70, the LED 50, and the light guide panel 90 are arranged in this order from the metal frame side. The LED 50 on the LED flexible wiring substrate is inserted into the mold 30 from the front side of the mold 30. The electronic component 40 is inserted into the mold 30 from the back side of the mold 30.

Figure 2:
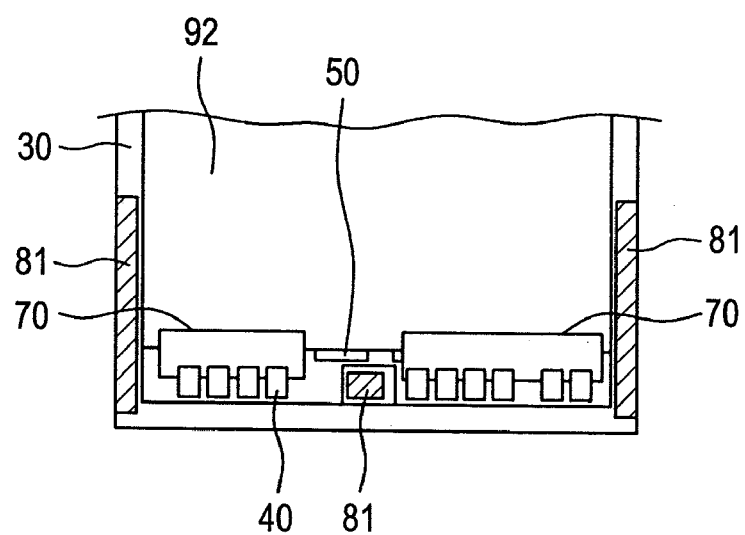
FIG. 2 is a back view of the liquid crystal display device according to the first embodiment.

FIG. 2 is a view from the back side of the liquid crystal display device shown in FIG. 1. In FIG. 2, the metal frame 100, the main flexible wiring substrate 20, and the LED flexible wiring substrate 60 are omitted. The mold-frame adhesive sheet 81 is provided on the lower surface of the mold 30 to fix the mold 30 and the metal frame 100 together. In FIG. 2, only the reflective sheet 92 can be seen as the optical component of the backlight.

In FIG. 2, part of the LED 50 is seen in the end portion of the reflective sheet 92. Plural LEDs 50 are arranged along the end portion of the light guide panel 90 not shown. In FIG. 2, the electronic components 40 are arranged along the inner end portion of the mold 30. In FIG. 2, the LEDs 50 and the electronic components 40 are arranged close to each other. In the present invention, the insulating sheet 70 is provided between the electronic components 40 and the LEDs 50 in order to prevent short circuit due to the contact between the LEDs 50 and the electronic components 40.

In FIG. 2, the insulating sheet 70 covers the electronic components 40 and the side of the LEDs 50, extending along the end portion of the reflective sheet 92. The insulating sheet 70 is not provided in the portion in which the electronic component 40 is not present. As seen from the comparison between the FIG. 2 and FIG. 8 of the conventional example, the distance between the LEDs 50 and the electronic components 40 is small in FIG. 2. In other words, the overall size of the liquid crystal display device can be reduced by this amount.

The thickness of the insulating sheet is preferably 0.03 mm or more and 0.1 mm or less. The lower limit of the thickness is calculated by taking into account the mechanical strength and the viscosity of the adhesive material formed on the surface. When the adhesive material is too thin, sufficient adhesive strength may not be obtained. The upper limit of the thickness is calculated so that the overall size of the liquid crystal display device is not increased, and that the flexibility of the insulating sheet 70 is not reduced. The adhesive material is formed on the surface of the insulating sheet 70, which bonds the insulating sheet 70 to the electronic components 40, the LEDs 50, or to the reflective sheet 92.

The material of the insulating sheet 70 is not specifically limited as long as the material can electrically insulate the LEDs 50 and the electronic components 40 from each other. However, a flexible material is preferred. Further, the insulating sheet 70 may come into contact with the LEDs 50 or the electronic components 40. Thus, preferably the material of the insulating sheet 70 is flexible and soft so that the LEDs 50 or the electronic components 40 are prevented from being destroyed even if they come into contact with the insulating sheet 70. With the configuration of this embodiment, when the LED 50 and the electronic component 40 come into contact with each other, the insulating sheet 70 plays a role of a buffer and prevents the LEDs 50 or the electronic components 40 from being destroyed. In this embodiment, the distance between the LEDs 50 and the electronic components 40 is at most about 0.5 mm including the thickness of the insulating sheet 70.

The appropriate color of the insulating sheet 70 is white or black. If the color of the insulating sheet 70 is white, it reflects the light from the LEDs 50 to increase the amount of light input to the side surface of the light guide panel 90. As a result, the use efficiency of the light from the LEDs 50 can be increased. An example of the white insulating sheet 70 is No. 7046/Tape thickness 0.085 mm, Viscosity 18N/20 mm, which is produced by Teraoka Seisakusho Co. Ltd.

When the color of the insulating sheet 70 is black, the following advantage can be obtained. That is, as shown in FIG. 1, the liquid crystal display panel and the mold 30 are bonded by the light shielding double-sided adhesive tape 80. The light shielding double-sided adhesive tape 80 is black. First, the light shielding double-sided adhesive tape 80 is attached to the mold 30 along the frame of the mold 30. Then, the liquid crystal display panel is placed on the light shielding double-sided adhesive tape 80 to fix the liquid crystal display panel to the mold 30. The light shielding double-sided adhesive tape 80 has been cut out to the shape of the frame by a press or other means before being attached to the mold 30. In other words, the portions other than those corresponding to the frame of the mold 30 are removed and discarded.

Here, the light shielding double-sided adhesive tape 80 is the insulating material, and can be used as the insulating sheet 70 according to the present invention. In other words, when the light shielding double-sided adhesive tape 80 is cut out along the frame of the mold 30, a portion of the adhesive tape is left without being removed to serve as the insulating sheet 70 between the LEDs 50 and the electronic components 40. The light shielding double-sided adhesive tape 80 is formed in a frame shape and is attached to the mold 30 at once. At this time, a portion of the light shielding double-sided adhesive tape 80 is used as the insulating sheet 70. In this way, it is possible to attach the insulating sheet 70 to the electronic component 40 and the like, at the same time when the light shielding double-sided adhesive tape 80 is attached to the mold 30.

As described above, by using a portion of the light shielding double-sided adhesive tape 80 as the insulating sheet 70, there is no increase in the cost of materials. In addition, there will hardly be an increase in the number of man hours for attaching the insulating sheet 70.

After the insulating sheet 70 is attached to the reflective sheet 92 or to the electronic components 40, the LEDs 50 are inserted into the mold 30. Then, the electronic components 40 are inserted into the mold 30. When the mold-frame adhesive sheet 81 has insulation properties, the insulating sheet 70 can be formed of the same material as the mold-frame adhesive sheet 81. In this case, the insulating sheet 70 can be placed when the mold-frame adhesive sheet 81 is attached to the mold 30.

As described above, according to this embodiment, it is possible to reduce the overall size due to the absence of the partition wall 31. In addition, it is also possible to eliminate the space for preventing the destruction of the LEDs 50 or the electronic components 40 due to the contact between the partition wall 31 and the LEDs 50 or the electronic components 40. As a result, the overall size of the liquid crystal display device can be reduced.

Second Embodiment

Figure 3:
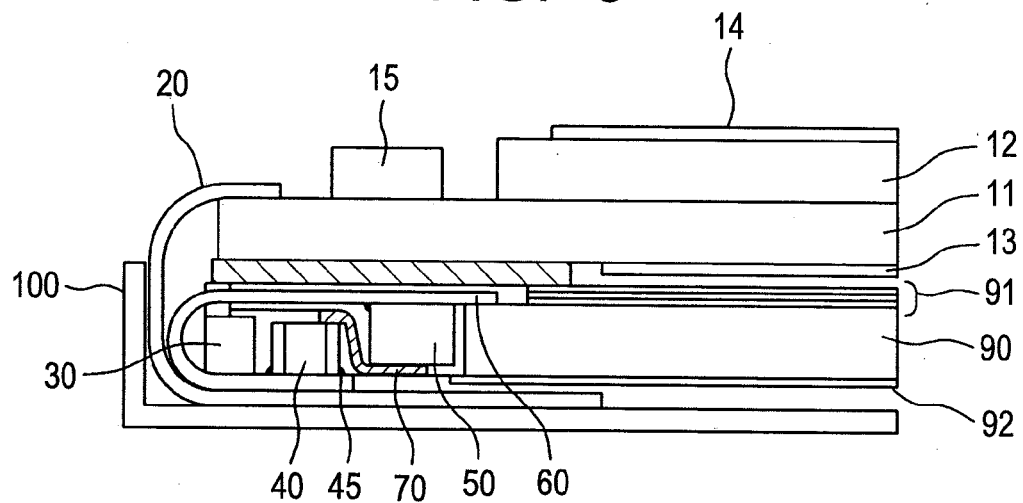
FIG. 3 is a cross-sectional view of a liquid crystal display device according to a second embodiment.

FIG. 3 is a cross-sectional view of a liquid crystal display device according to a second embodiment. FIG. 3 is different from the first embodiment in that the insulating sheet 70 is not attached to the reflective sheet 92, but is attached to the lower surface of the LEDs 50. The length of the reflective sheet 92 is reduced by this amount. The other configuration shown in FIG. 3 is the same as the configuration shown in FIG. 1. In the second embodiment, the insulating sheet 70 is attached to the lower surface of the LEDs 50, not to the lower surface of the reflective sheet 92. As a result, it is possible to reduce the thickness of the liquid crystal display device by the amount of thickness of the insulating sheet 70.

Figure 4:
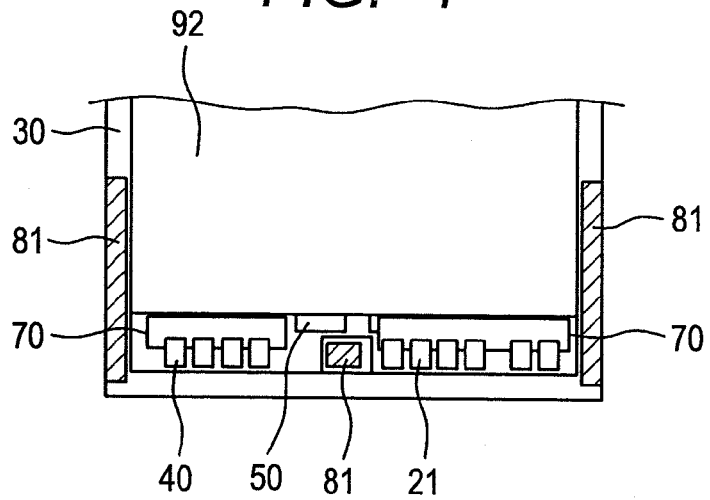
FIG. 4 is a back view of the liquid crystal display device according to the second embodiment.

FIG. 4 is a view from the back side of the liquid crystal display device shown in FIG. 3. In FIG. 4, the metal frame 100, the main flexible wiring substrate 20, and the LED flexible wiring substrate 60 are omitted. The mold-frame adhesive sheet 81 is provided on the lower surface of the mold 30 to fix the mold 30 to the metal frame 100. In FIG. 4, only the reflective sheet 92 can be seen as the optical component of the backlight.

In FIG. 4, plural LEDs 50 are arranged along the end portion of the light guide panel 90 not shown. The LEDs 50 are covered by the insulating sheet 70 and by the reflective sheet 92. However, the insulating sheet 70 is not provided in the portion in which the electronic component 40 is not present. Also in this embodiment, the distance between the electronic component 40 and the LED 50 can be reduced. As a result, the overall size of the liquid crystal display device can be reduced.

In this embodiment, the insulating sheet 70 is not bonded to the reflective sheet 92. The reflective sheet 92 is bonded to the mold 30 or to the light guide panel 90 at a portion not shown. The reflective sheet 92 is formed of metal and has a large area, in which there is a problem of thermal expansion. When the reflective sheet 92 is bonded by means of the adhesive material, a stress is applied to the reflective sheet 92 due to the temperature change. When the insulating sheet 70 is bonded to the reflective sheet 92, the stress further increases due to the thermal expansion.

On the other hand, in this embodiment, as shown in FIG. 3 or 4, the insulating sheet 70 is not bonded to the reflective sheet 92, causing no thermal expansion stress in the insulating sheet 70 or in the reflective sheet 92. The insulating sheet 70 is bonded to the lower surface of the LEDs 50. However, the area and length of the insulating sheet 70 are much smaller than those of the reflective sheet 92. As a result, there is very little stress due to the thermal expansion.

In the case of the liquid crystal display device with the configuration of FIG. 3, the LEDs 50 are inserted into the mold 30, and the insulating sheet 70 is bonded to the LEDs 50. Then the electronic components 40 are inserted into the mold 30 to form the liquid crystal display device.

As described above, according to the second embodiment, the same effect as the first embodiment can be obtained. In addition, the thickness of the liquid crystal display device can be further reduced while preventing the stress of thermal expansion. As a result, the reliability of the liquid crystal display device can be increased.

What is claimed is:

1. A liquid crystal display device comprising:
   a liquid crystal display panel mounted on a mold; and
   a backlight placed in the mold,
   wherein the backlight includes a light guide panel, an LED provided on a side surface of the light guide panel, and a reflective sheet provided on a back side of the light guide panel,
   wherein a main flexible wiring substrate on which at least one electronic component is mounted is attached to the liquid crystal display panel,
   wherein the at least one electronic component is arranged along an end surface of the mold,
   wherein the LED is mounted on an LED flexible wiring substrate, and
   wherein an insulating sheet is provided between the at least one electronic component and the LED.

2. The liquid crystal display device according to claim 1, wherein the insulating sheet is bonded to the at least one electronic component and to the reflective sheet.

3. The liquid crystal display device according to claim 1, wherein the insulating sheet is bonded to the at least one electronic component and to the LED.

4. The liquid crystal display device according to claim 1, wherein the insulating sheet is a white adhesive sheet.

5. The liquid crystal display device according to claim 1, wherein the insulating sheet is formed of the same material as a double-sided adhesive sheet bonding the liquid crystal display panel and the mold together.

6. A liquid crystal display device comprising:
   a liquid crystal display panel mounted on a mold; and
   a backlight placed in the mold,
   wherein the backlight includes a light guide panel, an LED provided on a side surface of the light guide panel, and a reflective sheet provided on a back side of the light guide panel,
   wherein a main flexible wiring substrate on which at least one electronic component is mounted is attached to the liquid crystal display panel,
   wherein the at least one electronic component is arranged along an end surface of the mold,
   wherein the main flexible wiring substrate is fixed to the mold,
   wherein the LED is mounted on an LED flexible wiring substrate,
   wherein the LED flexible wiring substrate is fixed to the light guide panel, and
   wherein an insulating sheet is provided between the at least one electronic component and the LED.

* * * * *